United States Patent
Yoon et al.

(10) Patent No.: US 11,662,018 B1
(45) Date of Patent: May 30, 2023

(54) METHOD AND SYSTEM FOR DIAGNOSING A VEHICLE OIL LEAK

(71) Applicants: HYUNDAI MOTOR COMPANY, Seoul (KR); KIA CORPORATION, Seoul (KR)

(72) Inventors: Young Min Yoon, Hwaseong-si (KR); Jae Yeol Yun, Gunpo-si (KR)

(73) Assignees: HYUNDAI MOTOR COMPANY, Seoul (KR); KIA CORPORATION, Seoul (KR)

( * ) Notice: Subject to any disclaimer, the term of this patent is extended or adjusted under 35 U.S.C. 154(b) by 0 days.

(21) Appl. No.: 17/894,844

(22) Filed: Aug. 24, 2022

(30) Foreign Application Priority Data

Mar. 17, 2022 (KR) .................. 10-2022-0033545

(51) Int. Cl.
*F16H 61/12* (2010.01)
*G01M 3/00* (2006.01)
*B60Q 9/00* (2006.01)

(52) U.S. Cl.
CPC .............. *F16H 61/12* (2013.01); *B60Q 9/00* (2013.01); *G01M 3/00* (2013.01); *F16H 2061/1216* (2013.01); *F16H 2061/1224* (2013.01); *F16H 2061/1232* (2013.01); *F16H 2061/1256* (2013.01)

(58) Field of Classification Search
CPC ............. F16H 61/12; F16H 2061/1216; F16H 2061/1224; F16H 2061/1232; F16H 2061/1256; G01M 3/00
See application file for complete search history.

(56) References Cited

U.S. PATENT DOCUMENTS

| 4,197,531 | A | * | 4/1980 | Wentworth, Jr. | ... G01M 3/2869 73/40 |
| 4,846,021 | A | * | 7/1989 | Hamano | ................ B60W 10/11 477/154 |
| 8,801,391 | B2 | | 8/2014 | Kigure | |
| 8,845,488 | B2 | | 9/2014 | Kawakami et al. | |
| 10,401,250 | B2 | * | 9/2019 | Hanss | ..................... G01M 3/26 |
| 10,502,314 | B2 | | 12/2019 | Mouri et al. | |
| 2011/0269583 | A1 | | 11/2011 | Kawakami et al. | |

(Continued)

FOREIGN PATENT DOCUMENTS

| JP | H0642624 A | 2/1994 |
| JP | 3780805 B2 | 5/2006 |

(Continued)

*Primary Examiner* — Edwin A Young
(74) *Attorney, Agent, or Firm* — Lempia Summerfield Katz LLC

(57) ABSTRACT

A method and a system of diagnosing a vehicle oil leak are capable of detecting an oil leak state of transmission oil on the basis of logic. The method includes an operating condition determination step of determining, by a controller, whether a minimum operating condition of a vehicle is satisfied. The minimum operating condition is required to normally generate a target line pressure by operating an EOP. The method includes a counting step of counting, by the controller, an operating time of the EOP when the minimum operating condition is satisfied and includes an oil leak diagnosis step of diagnosing, by the controller, an oil leak when the counted continuous operating time of the EOP is a permissible time or more.

12 Claims, 5 Drawing Sheets

(56) References Cited

U.S. PATENT DOCUMENTS

2012/0244012 A1 9/2012 Kigure
2016/0003346 A1 1/2016 Lee et al.
2017/0108112 A1* 4/2017 Yoon .................. F16H 57/0412

FOREIGN PATENT DOCUMENTS

| JP | 4432909 B2 | 3/2010 |
| JP | 4692622 B2 | 6/2011 |
| JP | 2011106296 A | 6/2011 |
| JP | 5331843 B2 | 10/2013 |
| KR | 20160007860 A | 1/2016 |
| KR | 102257757 B1 | 5/2021 |

* cited by examiner

METHOD AND SYSTEM FOR DIAGNOSING A VEHICLE OIL LEAK

CROSS REFERENCE TO RELATED APPLICATION

The present application claims priority of Korean Patent Application No. 10-2022-0033545 filed on Mar. 17, 2022, the entire contents of which are incorporated herein for all purposes by this reference.

BACKGROUND OF THE DISCLOSURE

Field of the Disclosure

The present disclosure relates to a method and a system for diagnosing a vehicle oil leak, which are capable of detecting a leak of transmission oil on the basis of logic.

Description of the Related Art

A wet dual-clutch transmission (DCT) refers to a transmission capable of transmitting high torque by using a wet multi-plate clutch.

A pressure sensor capable of checking a hydraulic pressure applied to two clutches is attached to recognize characteristics between the hydraulic pressure and the torque transmitted to the clutches. Thus, a solenoid valve may be controlled.

To control the torque of the clutch, an appropriate clutch hydraulic pressure needs to be applied, and engine torque needs to be transmitted as clutch torque. A high-pressure clutch hydraulic pressure is required to transmit high torque as the clutch torque. In this case, a line pressure generated by an accumulator needs to be higher than a clutch target pressure in order to control the clutch hydraulic pressure as a high pressure.

Meanwhile, recently, an electric oil pump (EOP) has been used instead of a mechanical oil pump (MOP) widely used for automatic transmissions. The EOP adopts an on-demand control method that generates a hydraulic pressure by using electrical energy at a necessary point in time.

The EOP uses a high-capacity accumulator and a line circuit with high sealing performance. Thus, a loss of energy required to generate a high pressure may be reduced.

A hydraulic system of the wet DCT separates and operates control oil and lubricating oil.

In other words, the EOP for lubricating a rotary part of a gear train and the EOP for cooling the clutch are separately installed. Thus, transmission efficiency may be improved by minimizing a drag loss caused by oil when the gear train rotates.

As described above, the control oil and the lubricating/cooling oil are separated, such that the cleanliness of an interior of a valve body is strictly managed. Thus, field claims may be reduced. Meanwhile, the lubricating/cooling oil is exclusively applied, thereby minimizing drag and improving durability.

A double concentric slave cylinder (CSC) is applied to the clutch and a flow path is connected to a non-rotatable operating piston part, Thus, an oil leak and drag between friction members may be minimized. A gear box has a flow rate control solenoid valve and a position sensor mounted on each shift fork. Therefore, it is possible to independently control operations of fastening or releasing gears for the respective shift forks.

Meanwhile, a hydraulic control part using a high pressure (max 70 bar) needs to be subjected to precise production quality management in order to ensure performance related to a leak, sealing, and sealability. However, there is a technical limitation in that an aluminum casing makes it difficult to detect whether an oil leak occurs. In some instances, the leak of the control oil may cause a breakdown that makes it impossible to drive the vehicle.

The foregoing explained as the background is intended merely to aid in understanding the background of the present disclosure. The foregoing is not intended to mean that the present disclosure falls within the purview of the related art that is already known to those having ordinary skill in the art.

SUMMARY OF THE DISCLOSURE

Accordingly, the present disclosure has been made keeping in mind the above problems occurring in the related art. The present disclosure is intended to provide a method and a system for diagnosing a vehicle oil leak, which are capable of detecting a leak of transmission oil on the basis of logic.

To achieve the above-mentioned object, the present disclosure provides a method of diagnosing a vehicle oil leak. The method includes an operating condition determination step of determining, by a controller, whether a minimum operating condition of a vehicle is satisfied. The minimum operating condition is required to normally generate a target line pressure by operating an electric oil pump (EOP). The method also includes a counting step of counting, by the controller, an operating time of the EOP when the minimum operating condition is satisfied. The method also includes an oil leak diagnosis step of diagnosing, by the controller, an oil leak when the counted continuous operating time of the EOP is a permissible time or more.

In the operating condition determination step, the minimum operating condition may be at least one of a battery voltage, an engine rotational speed, an oil temperature, an EOP target rotational speed, or an absolute value of a difference between the EOP target rotational speed and an actual rotational speed.

The oil leak diagnosis step may include: additionally counting the operating time of the EOP when the counted continuous operating time of the EOP is a first permissible time or more; and diagnosing the oil leak when the additionally counted continuous operating time of the EOP is a second permissible time or more.

The second permissible time may be shorter than the first permissible time.

The oil leak diagnosis step may include: determining whether the number of times the EOP continuously operates for the permissible time or more is a permissible number of times or more; and diagnosing the oil leak when the number of times the EOP continuously operates for the permissible time or more is the permissible number of times or more.

The method may include resetting the counted continuous operating time of the EOP when the number of times the EOP continuously operates for the permissible time or more is smaller than the permissible number of times.

The method may include after the counting step, resetting the counted continuous operating time of the EOP when the minimum operating condition is not satisfied.

The method may include warning of an abnormal situation of a hydraulic system when the oil leak is diagnosed.

The method may include decreasing the target line pressure when the oil leak is diagnosed.

The method may include performing single clutch traveling of a dual-clutch transmission (DCT) vehicle when the oil leak is diagnosed.

The present disclosure provides a system for diagnosing a vehicle oil leak. The system includes a condition determination unit configured to determine whether a minimum operating condition of a vehicle is satisfied. The minimum operating condition is required to normally generate a target line pressure by operating an EOP, is satisfied. The system also includes a counting unit configured to count an operating time of the EOP when the minimum operating condition is satisfied. The system also includes an oil leak diagnosis unit configured to diagnose an oil leak when the counted continuous operating time of the EOP is a permissible time or more.

According to the technical solution of the present disclosure, since the hydraulic system detects an oil leak state of the control oil on the basis of logic, a sensor such as an oil level sensor is eliminated, thereby reducing costs.

Therefore, when a leak of the control oil is diagnosed, the controller warns the driver of the abnormal situation of the hydraulic system and induces the driver to inspect the transmission. Further, the controller decreases the target line pressure and performs the single clutch gear shifting. The frequency of the continuous operation of the EOP is thereby reduced and thus the motor is prevented from being overheated and burnt out.

DETAILED DESCRIPTION OF THE DISCLOSURE

Figure 1:
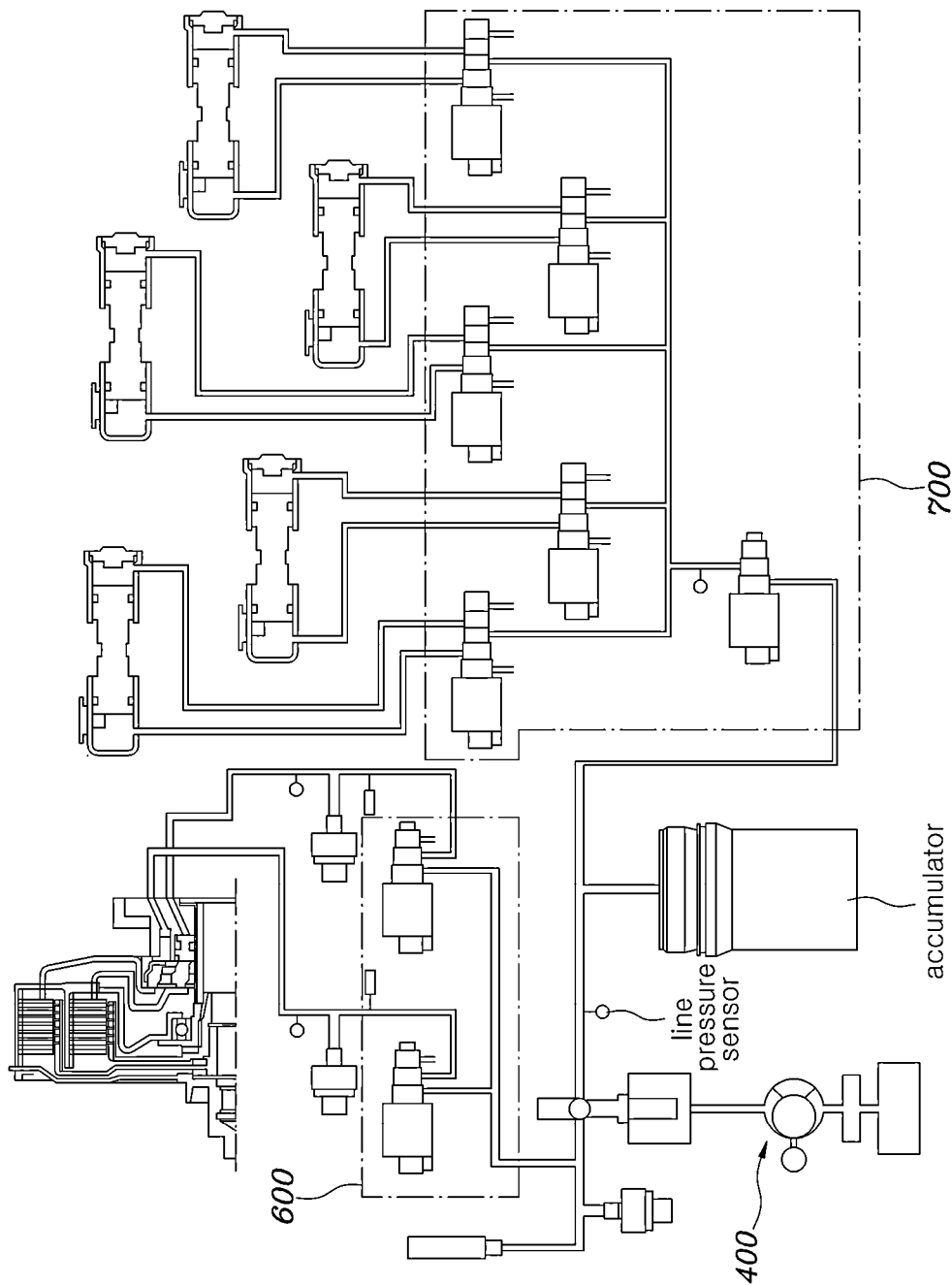
FIG. 1 is a hydraulic circuit diagram of a wet dual-clutch transmission (DCT) hydraulic system to which the present disclosure is applicable.

Specific structural or functional descriptions of embodiments of the present disclosure disclosed in this specification or application are exemplified only for the purpose of explaining the embodiments according to the present disclosure. The embodiments according to the present disclosure may be carried out in various forms. It should not be interpreted that the present disclosure is limited to the embodiments described in this specification or application.

Because the embodiments according to the present disclosure may be variously changed and may have various forms, specific embodiments are illustrated in the drawings and described in detail in the present specification or application. However, the descriptions of the specific embodiments are not intended to limit embodiments according to the concept of the present disclosure to the specific embodiments. It should be understood that the present disclosure covers all modifications, equivalents, and alternatives falling within the spirit and technical scope of the present disclosure.

The terms such as "first" and/or "second" may be used to describe various constituent elements, but these constituent elements should not be limited by these terms. These terms are used only for the purpose of distinguishing one constituent element from other constituent elements. For example, without departing from the scope according to the concept of the present disclosure, the first constituent element may be referred to as the second constituent element, and similarly, the second constituent element may also be referred to as the first constituent element.

When one constituent element is described as being "coupled" or "connected" to another constituent element, it should be understood that one constituent element can be coupled or connected directly to another constituent element, and an intervening constituent element can also be present between the constituent elements. When one constituent element is described as being "coupled directly to" or "connected directly to" another constituent element, it should be understood that no intervening constituent element is present between the constituent elements. Other expressions, i.e., "between" and "just between" or "adjacent to" and "directly adjacent to", for explaining a relationship between constituent elements, should be interpreted in a similar manner.

The terms used in the present specification are used only for the purpose of describing particular embodiments and are not intended to limit the present disclosure. Singular expressions include plural expressions unless clearly described as different meanings in the context. In the present specification, it should be understood the terms "comprises," "comprising," "includes," "including," "containing," "has," "having" or other variations thereof are inclusive and thus specify the presence of stated features, numbers, steps, operations, elements, components, or combinations thereof. However, these terms do not preclude the presence or addition of one or more other features, numbers, steps, operations, elements, components, or combinations thereof.

Unless otherwise defined, all terms used herein, including technical or scientific terms, have the same meaning as commonly understood by those having ordinary skill in the art to which the present disclosure pertains. The terms such as those defined in commonly used dictionaries should be interpreted as having meanings consistent with meanings in the context of related technologies and should not be interpreted as ideal or excessively formal meanings unless explicitly defined in the present specification.

A controller according to the embodiments of the present disclosure may be implemented by a non-volatile memory (not illustrated) configured to store an algorithm for controlling operations of various constituent elements in a vehicle or store data related to software commands for executing the algorithm. The controller may be implemented by a processor (not illustrated) configured to perform the following operations by using the data stored in the corresponding memory. In this case, the memory and the processor may be implemented as separate chips. Alternatively, the memory and the processor may be implemented as a single chip in which the memory and the processor are integrated. The processor may be configured in the form of one or more processors.

In addition, the terms "control unit" or "unit" including "hybrid controller (HCU)", "determining unit", "determination unit", or "vehicle control unit (VCU)" are merely terms widely used to name a control device (controller) for controlling a particular vehicle function but do not mean a generic function unit. For example, the controller may include a communication device configured to communicate with another controller or a sensor to control a corresponding function, a memory configured to store an operating system, a logic command, and input/output information, and one or more processors configured to perform determination, computation, decision, or the like require the control the corresponding function.

Hereinafter, embodiments of the present disclosure are described in detail with reference to the accompanying drawings.

Figure 2:
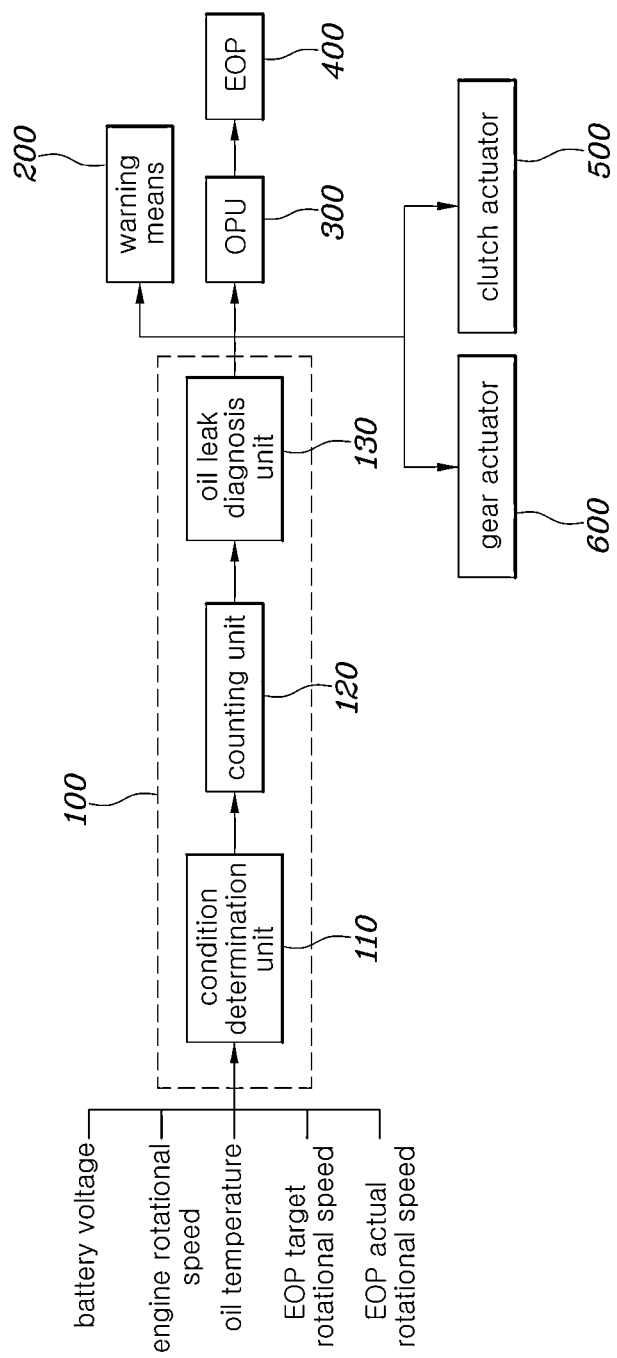
FIG. 2 is a view schematically illustrating a configuration of a system for diagnosing an oil leak according to the present disclosure.

FIG. 1 is a hydraulic circuit diagram of a wet dual-clutch transmission (DCT) hydraulic system according to the present disclosure, and FIG. 2 is a view schematically illustrating a configuration of a system for diagnosing an oil leak according to the present disclosure.

Referring to the drawings, a system for diagnosing a vehicle oil leak according to the present disclosure includes a condition determination unit 110 configured to determine whether a minimum operating condition of a vehicle is satisfied. The minimum operating condition is required to normally generate a target line pressure by operating an electric oil pump (EOP). The system also includes a counting unit 120 configured to count an operating time of the EOP 400 when the minimum operating condition is satisfied. The system also includes an oil leak diagnosis unit 130 configured to diagnose an oil leak when the counted continuous operating time of the EOP 400 is a permissible time or more.

Specifically, the condition determination unit 110, the counting unit 120, and the oil leak diagnosis unit 130 may be implemented in the form of separate chips or a single integrated chip in the controller.

Further, the controller may be a transmission control unit (TCU). The controller may control an operation of the EOP 400 by applying a signal to an oil pump unit (OPU) 300 configured to control the EOP 400. In addition, the controller may control a solenoid valve of a clutch actuator 500 and a solenoid valve of a gear actuator 600. Thus, a gear shifting operation may be suitably performed for a traveling situation.

A battery voltage, an engine rotational speed, an oil temperature, an EOP target rotational speed, and an EOP actual rotational speed are inputted to the condition determination unit 110.

Further, when an oil leak is diagnosed, the oil leak diagnosis unit 130 outputs signals to a warning means 200 and the OPU 300 and controls the operations of the clutch actuator 500 and the gear actuator 600, thereby warning of an abnormal situation of the hydraulic system. Further, the oil leak diagnosis unit 130 adjusts the operating time of the EOP 400 by decreasing the target line pressure. Further, the oil leak diagnosis unit 130 controls the vehicle so that the vehicle switches from double clutch gear shifting to single clutch gear shifting, thereby implementing limp-home traveling.

Figure 3:
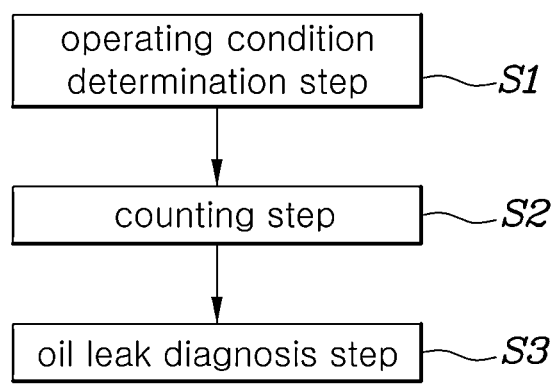
FIG. 3 is a view illustrating a method of diagnosing an oil leak according to the present disclosure for respective steps.

Meanwhile, FIG. 3 is a view illustrating a method of diagnosing an oil leak according to the present disclosure for respective steps.

Referring to the drawings, a method of diagnosing a vehicle oil leak according to the present disclosure includes an operating condition determination step S1 of determining, by a controller 100, whether the minimum operating condition of the vehicle is satisfied. The minimum operating condition is required to normally generate the target line pressure by operating the EOP 400. The method also includes a counting step S2 of counting, by the controller 100, the operating time of the EOP 400 when the minimum operating condition is satisfied. The method also includes an oil leak diagnosis step S3 of diagnosing, by the controller 100, an oil leak when the counted continuous operating time of the EOP 400 is the permissible time or more.

In this case, the EOP 400 is an HP EOP that generates the line pressure by operating control oil, and the HP EOP is referred to as the EOP hereinafter.

In other words, when the EOP cannot normally generate the target line pressure of the control oil or the operating time of the EOP required to generate the target line pressure increases even though the EOP operates in a state of the vehicle, a user cannot know whether this situation is caused by an oil leak or other causes in the vehicle.

However, in a case in which the EOP cannot normally generate the target line pressure when the EOP operates in a state in which there is no problem in the vehicle, it can be determined that this situation is caused by a lack of oil.

Therefore, the minimum operating condition, which is required for the EOP to normally generate the target line pressure, is set in advance. When the operating condition is satisfied, the controller determines the continuous operating time of the EOP 400 and diagnoses an oil leak situation when the continuous operating time is longer than a preset time.

Therefore, since the wet DCT hydraulic system detects the oil leak state of the control oil on the basis of logic, a sensor such as an oil level sensor is eliminated, thereby reducing costs.

Figure 4:
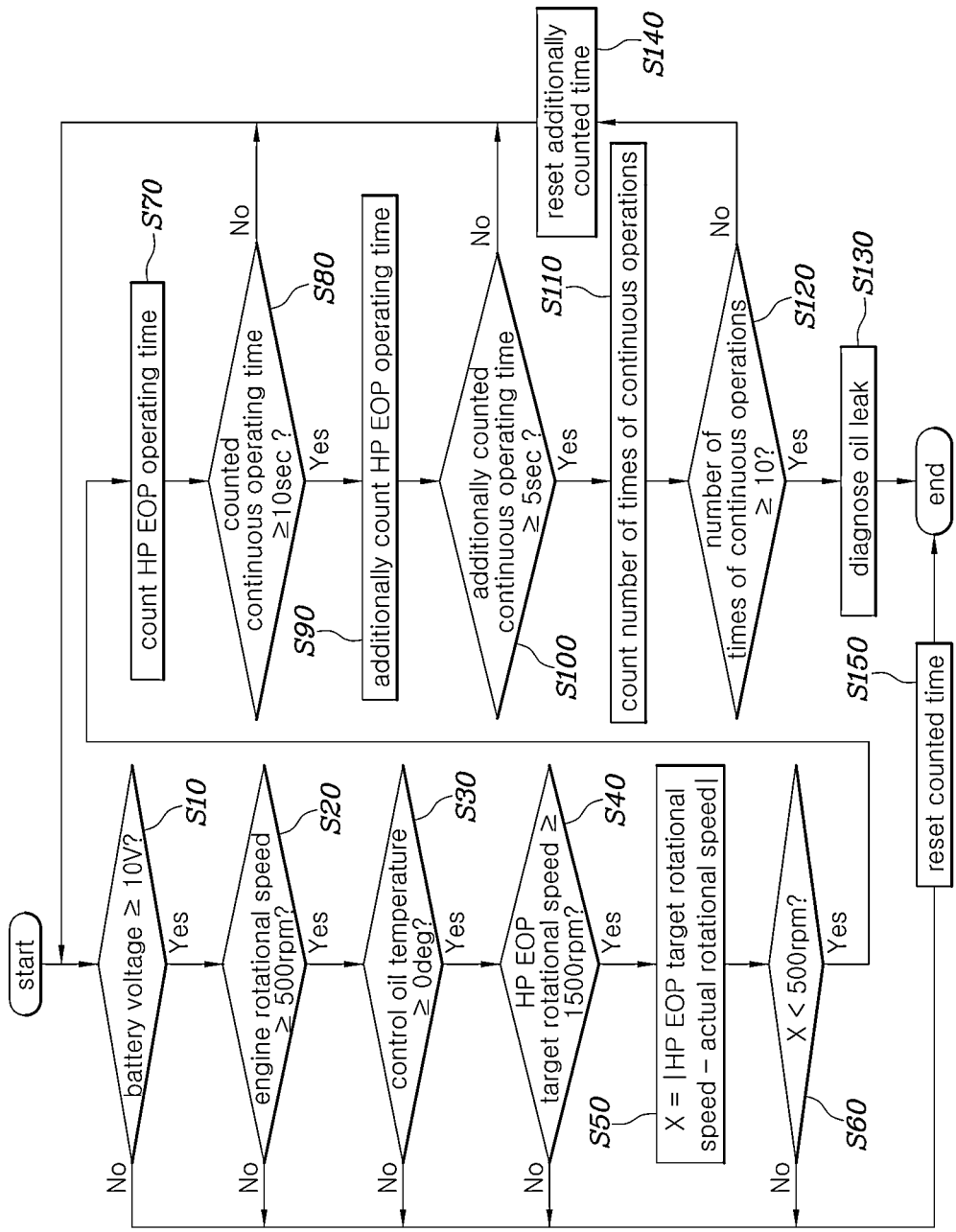
FIG. 4 is a flowchart illustrating a flow of a process of diagnosing an oil leak according to the present disclosure.

FIG. 4 is a flowchart illustrating a flow of a process of diagnosing an oil leak according to the present disclosure.

Referring to the drawings, according to the present disclosure, in the operating condition determination step S1, the minimum operating condition may be at least one of the battery voltage, the engine rotational speed, the oil temperature, the EOP target rotational speed, and an absolute value of a difference between the EOP target rotational speed and the actual rotational speed.

For example, it can be determined that the minimum operating condition is satisfied when one of a number of conditions is satisfied. These conditions include: a condition in which the battery voltage is a predetermined value or more; a condition in which the engine rotational speed is a predetermined rotational speed or more; a condition in which the oil temperature (control oil temperature) is a predetermined temperature or higher; a condition in which the EOP target rotational speed is a predetermined rotational speed or higher; and a condition in which the absolute value of the difference between the EOP target rotational speed and the actual rotational speed is less than a predetermined value.

Further, the controller may diagnose an oil leak when the continuous operating time of the EOP 400, which is counted in the oil leak diagnosis step S3, is the permissible time or more.

In other words, when the continuous operating time of the EOP 400, which is required for the EOP 400 to generate the target line pressure, becomes longer than the preset time, the current vehicle has no abnormality, and the minimum operating condition is satisfied. Therefore, the controller may diagnose a situation in which oil is insufficient because of a control oil leak.

Specifically, in the oil leak diagnosis step S3, when the counted continuous operating time of the EOP 400 is a first permissible time or more, the operating time of the EOP 400 is additionally counted. When the additionally counted continuous operating time of the EOP 400 is a second permissible time or more, the controller may diagnose an oil leak.

In this case, the second permissible time may be set to be shorter than the first permissible time.

In other words, the EOP 400 operates, and the time for which the EOP 400 continuously operates is primarily counted. The controller determines whether the EOP 400 continuously operates so that the counted time is a preset time (e.g., 10 sec) or more.

Further, when the EOP 400 continuously operates so that the counted time is the preset time or more, the operating time of the EOP is additionally counted secondarily separately from the previously counted operating time. The controller also determines whether the EOP 400 continuously operates so that the additionally counted time is a preset time (e.g., 5 sec) or more.

Therefore, in the oil leak diagnosis step S3, the controller further determines whether the number of times the EOP operates for the permissible time or more is a permissible number of times or more. When the number of times the EOP operates for the permissible time or more is the permissible number of times or more, the controller diagnoses an oil leak.

For example, assuming that the permissible time is 5 seconds and the permissible number of times is 10, the number of times the EOP continuously operates increases by 1 as the additionally counted continuous operating time of the EOP 400 is 5 seconds or more.

When the number of times the EOP continuously operates, which increases as described above, becomes 10 or more, the controller diagnoses an oil leak.

However, when the number of times the EOP continuously operates for the permissible time or more is smaller than the permissible number of times, the counted continuous operating time of the EOP 400 is reset.

In other words, when the additionally counted continuous operating time of the EOP 400 is 5 seconds or more, the number of times the EOP continuously operates increases by 1. Simultaneously, the additionally counted continuous operating time of the EOP 400 is reset to 0, such that the logic is repeatedly performed until the number of times the EOP continuously operates becomes 10.

Meanwhile, after the counting step S2, the counted continuous operating time of the EOP 400 is reset when the minimum operating condition is not satisfied.

For example, it can be determined that the minimum operating condition is not satisfied when one of a number of conditions is satisfied. These conditions include: a condition in which the battery voltage is less than the predetermined value or more; a condition in which the engine rotational speed is lower than the predetermined rotational speed; a condition in which the oil temperature (control oil temperature) is lower than the predetermined temperature; a condition in which the EOP target rotational speed is lower than the predetermined rotational speed; and a condition in which the absolute value of the difference between the EOP target rotational speed and the actual rotational speed is the predetermined value or more.

In this case, because a large amount of time may be required to generate the target line pressure because of other abnormal situation of the vehicle other than the oil leak, the logic need not be performed. Therefore, the previously counted continuous operating time of the EOP 400 is initialized to 0.

Meanwhile, the present disclosure may warn of an abnormal situation of the hydraulic system through the warning means 200 when an oil leak is diagnosed.

For example, when the oil leak is diagnosed, a failure code of the hydraulic system of the transmission is activated and MIL turning-on and warning words and the like are additionally displayed on a cluster. Thus, a driver may be induced to inspect the transmission.

Further, the present disclosure may decrease the target line pressure when an oil leak is diagnosed.

In other words, when the control oil leaks (a level of oil is lower than a rotating body rotor assembly), an EOP motor may be overheated or burnt out because of a lack of lubrication of a motor bearing part.

Figure 5:
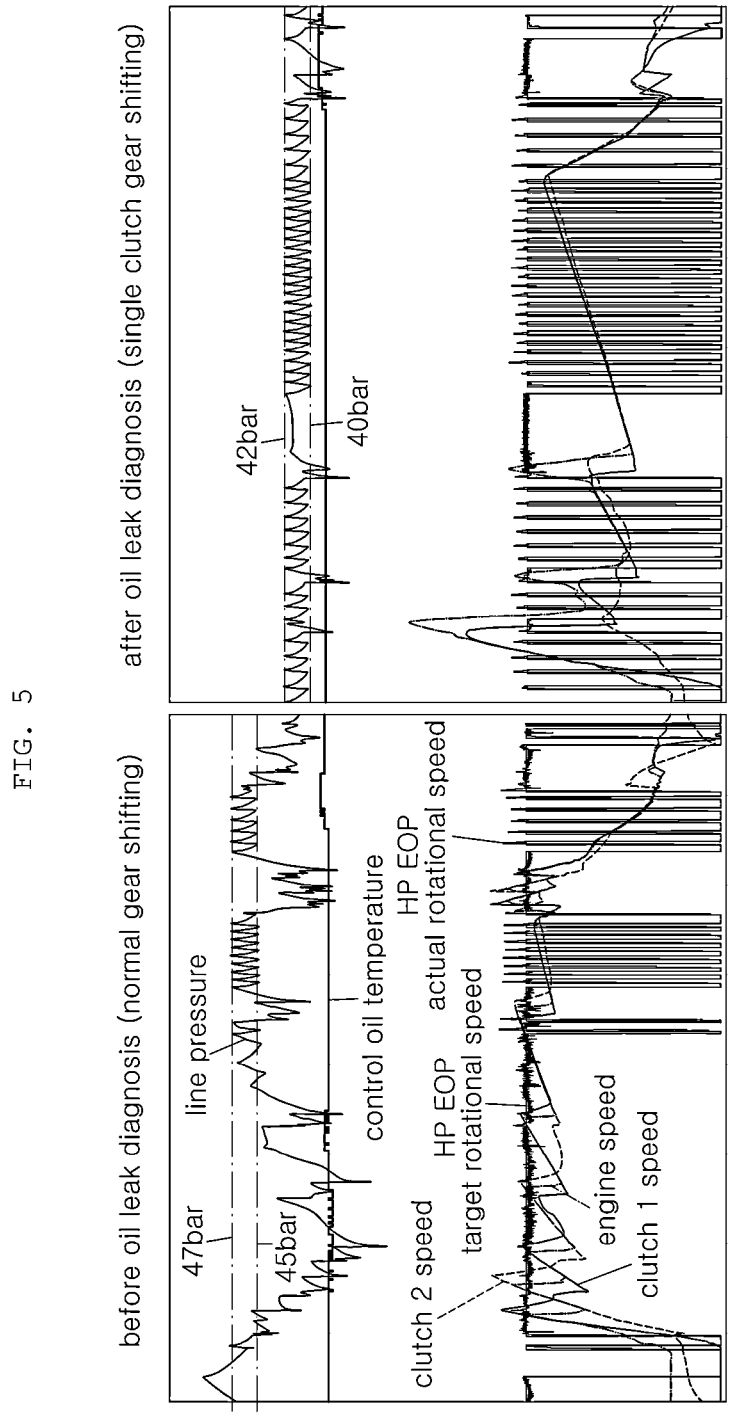
FIG. 5 is a view illustrating changes in line pressure before and after the oil leak diagnosis according to the present disclosure and illustrating vehicle data in a state in which a vehicle switches from double clutch gear shifting to single clutch gear shifting.

Therefore, when a leak of control oil is diagnosed and an oil leak signal is transmitted to the OPU 300, the OPU 300 decreases a range of the target line pressure (e.g., from 45-47 bar to 40-42 bar). Therefore, as illustrated in FIG. 5, the line pressure generated by the EOP 400 decreases, and the frequency of the continuous operation of the EOP 400 decreases, such that the motor is prevented from being overheated and burnt out.

Further, according to the present disclosure, a DCT vehicle may perform single clutch traveling when an oil leak is diagnosed.

In other words, when the controller 100 determines that the control oil leaks, the controller 100 controls the vehicle so that the vehicle switches from the double clutch gear shifting to the single clutch gear shifting by controlling the hydraulic pressure applied to the solenoid valve of the clutch actuator 500 and the solenoid valve of the gear actuator 600. The single clutch gear shifting refers to a gear shifting method that shifts gears by using only one of the two clutches.

Therefore, when the vehicle travels using the single clutch gear shifting, the number of times the gear shifting is performed is reduced in comparison with a normal situation in which the vehicle travels using the double clutch gear shifting. Therefore, the amount of control oil to be consumed decreases to prevent an increase in line pressure of the control oil, thereby preventing the continuous operation of the EOP 400 and thus preventing a breakdown of the EOP motor.

Hereinafter, a process of diagnosing a leak of the control oil in the wet DCT hydraulic system according to the present disclosure is described.

Referring to FIG. 4, the conditions in respect to the battery voltage, the engine rotational speed, the control oil temperature, the EOP target rotational speed, and the absolute value of the difference between the EOP target rotational speed and the actual rotational speed are determined while the vehicle travels.

In other words, the controller determines whether the battery voltage is 10 V or more (S10), whether the engine rotational speed is 500 rpm or higher (S20), whether the control oil temperature is 0° C. or higher (S30), and whether the EOP target rotational speed is 1500 rpm or higher (S40). Further, the controller calculates the absolute value X of the difference between the EOP target rotational speed and the actual rotational speed (S50) and determines whether the calculated value X is lower than 500 rpm (S60).

Therefore, when the determination results in steps S10, S20, S30, S40, and S60 indicate that all the conditions are satisfied (Yes in S10, S20, S30, S40, and S60), the operating time of the EOP 400 operating to generate the target line pressure is primarily counted, such that the continuous operating time is acquired (S70).

In contrast, when the determination results in steps S10, S20, S30, S40, and S60 indicate that not all of the conditions are satisfied (No in S10, S20, S30, S40, or S60), the primarily counted continuous operating time of the EOP 400 is reset to 0 (S150).

Meanwhile, the controller determines whether the continuous operating time counted in step S70 is 10 seconds or more (S80). When the continuous operating time is 10 second or more (Yes in S80), the operating time of the EOP 400 is secondarily counted additionally separately from the primarily counted operating time of the EOP 400, such that the continuous operating time is acquired (S90).

In contrast, when the determination result in step S80 indicates that the continuous operating time is less than 10 seconds (No in S80), the process goes to the step before step S10, and the controller determines whether the minimum operating condition of the vehicle is satisfied.

Meanwhile, the controller determines whether the continuous operating time additionally counted in step S90 is 5 seconds or more (S100). When the additionally counted continuous operating time becomes 5 seconds or more (Yes in S100), the number of times the EOP continuously operates for 5 seconds or more is counted and increased by 1 (S110)

Next, in step S110, the controller determines whether the number of times the EOP 400 continuously operates for 5 seconds or more is 10 or more (S120). When the number of times the EOP 400 continuously operates for 5 seconds or more is 10 or more (Yes in S120), the controller diagnoses a situation in which the control oil leaks (S130).

In contrast, in step S120, when the number of times the EOP 400 continuously operates for 5 seconds or more is less than 10 (No in S120), the secondarily counted continuous operating time is reset to 0 (S140), the process goes to the step before step S10, and then the controller determines whether the minimum operating condition of the vehicle is satisfied.

In step S130, when the controller diagnoses the situation in which the control oil leaks, the controller warns the driver of the abnormal situation of the hydraulic system by turning on the light or display, decreases the target line pressure of the control oil, and allows the vehicle to travel using the single clutch gear shifting. The limp-home mode is thereby implemented.

According to the present disclosure described above, since the wet DCT hydraulic system detects the oil leak state of the control oil on the basis of logic, a sensor such as an oil level sensor is eliminated, thereby reducing costs.

Therefore, when a leak of the control oil is diagnosed, the controller warns the driver of the abnormal situation of the hydraulic system and induces the driver to inspect the transmission. Further, the controller decreases the target line pressure and performs the single clutch gear shifting. The frequency of the continuous operation of the EOP 400 is thereby reduced, and thus the motor is prevented from being overheated and burnt out.

While the present disclosure has been described with reference to the specific examples, it should be apparent to those having ordinary skill in the art that various modifications and alterations may be made within the technical spirit of the present disclosure, and these modifications and alterations belong to the appended claims.

What is claimed is:

1. A method of diagnosing a vehicle oil leak, the method comprising:
    an operating condition determination step of determining, by a controller, whether a minimum operating condition of a vehicle is satisfied, the minimum operating condition being required to normally generate a target line pressure by operating an electric oil pump (EOP);
    a counting step of counting, by the controller, an operating time of the EOP when the minimum operating condition is satisfied; and
    an oil leak diagnosis step of diagnosing, by the controller, an oil leak when the counted continuous operating time of the EOP is a permissible time or more.

2. The method of claim 1, wherein in the operating condition determination step, the minimum operating condition is at least one of a battery voltage, an engine rotational speed, an oil temperature, an EOP target rotational speed, or an absolute value of a difference between the EOP target rotational speed and an actual rotational speed.

3. The method of claim 1, wherein the oil leak diagnosis step comprises:
    additionally counting the operating time of the EOP when the counted continuous operating time of the EOP is a first permissible time or more; and
    diagnosing the oil leak when the additionally counted continuous operating time of the EOP is a second permissible time or more.

4. The method of claim 3, wherein the second permissible time is shorter than the first permissible time.

5. The method of claim 1, wherein the oil leak diagnosis step comprises:
    determining whether a number of times the EOP continuously operates for the permissible time or more is a permissible number of times or more; and
    diagnosing the oil leak when the number of times the EOP continuously operates for the permissible time or more is the permissible number of times or more.

6. The method of claim 5, comprising:
    resetting the counted continuous operating time of the EOP when the number of times the EOP continuously operates for the permissible time or more is smaller than the permissible number of times.

7. The method of claim 1, comprising:
    after the counting step, resetting the counted continuous operating time of the EOP when the minimum operating condition is not satisfied.

8. The method of claim 1, comprising:
    warning of an abnormal situation of a hydraulic system when the oil leak is diagnosed.

9. The method of claim 1, comprising:
    decreasing the target line pressure when the oil leak is diagnosed.

10. The method of claim 1, comprising:
    performing single clutch traveling of a dual-clutch transmission (DCT) vehicle when the oil leak is diagnosed.

11. The method of claim 1, wherein oil leak diagnosis is performed on transmission oil.

12. A system for diagnosing a vehicle oil leak, the system comprising:
    a condition determination unit configured to determine whether a minimum operating condition of a vehicle is satisfied, the minimum operating condition being required to normally generate a target line pressure by operating an electric oil pump (EOP);
    a counting unit configured to count an operating time of the EOP when the minimum operating condition is satisfied; and
    an oil leak diagnosis unit configured to diagnose an oil leak when the counted continuous operating time of the EOP is a permissible time or more.

* * * * *